(12) United States Patent
Yasuda

(10) Patent No.: US 11,360,249 B2
(45) Date of Patent: Jun. 14, 2022

(54) MULTILAYER STRUCTURE

(71) Applicant: FUJIFILM CORPORATION, Tokyo (JP)

(72) Inventor: Hideki Yasuda, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/337,436

(22) Filed: Jun. 3, 2021

(65) Prior Publication Data

US 2021/0286116 A1 Sep. 16, 2021

Related U.S. Application Data

(63) Continuation of application No. PCT/JP2019/044510, filed on Nov. 13, 2019.

(30) Foreign Application Priority Data

Dec. 4, 2018 (JP) .............................. JP2018-227602

(51) Int. Cl.
```
F25B 23/00      (2006.01)
G02B 5/20       (2006.01)
G02B 1/04       (2006.01)
G02B 5/26       (2006.01)
B32B 7/027      (2019.01)
```
(52) U.S. Cl.
CPC ............ *G02B 5/208* (2013.01); *F25B 23/003* (2013.01); *G02B 1/04* (2013.01); *G02B 5/26* (2013.01); *B32B 7/027* (2019.01)

(58) Field of Classification Search
CPC ........ F25B 23/003; G02B 5/208; F28F 13/18; F28F 9/20; F28F 2245/00
See application file for complete search history.

(56) References Cited

U.S. PATENT DOCUMENTS 4,323,619 A * 4/1982 Silvestrini ............. F25B 23/003
428/212
2015/0338175 A1 11/2015 Raman et al.
(Continued)

FOREIGN PATENT DOCUMENTS

JP S57-150767 A 9/1982
JP S57150767 A * 9/1982
(Continued)

OTHER PUBLICATIONS

International Search Report issued in International Application No. PCT/JP2019/044510 dated Dec. 24, 2019.
(Continued)

*Primary Examiner* — Jianying C Atkisson
*Assistant Examiner* — Erik Mendoza-Wilkenfel
(74) *Attorney, Agent, or Firm* — Solaris Intellectual Property Group, PLLC

(57) ABSTRACT

Provided is a multilayer structure including a radiator, a base material layer that includes a region forming an interface in an internal structure, and a first air layer that is provided between the radiator and the base material layer, in which a far-infrared transmittance B of the base material layer and a solar light reflectance A of the multilayer structure satisfy B/(100−A)>7, and a solar light reflectance C of the base material layer is 30% or more.

13 Claims, 2 Drawing Sheets

(56) References Cited

U.S. PATENT DOCUMENTS

| | | |
|---|---|---|
| 2019/0008217 A1* | 1/2019 | Cui .......................... B32B 5/26 |
| 2019/0184687 A1 | 6/2019 | Yasuda et al. |
| 2019/0234658 A1 | 8/2019 | Yoshihiro et al. |
| 2019/0257557 A1 | 8/2019 | Yoshizawa et al. |

FOREIGN PATENT DOCUMENTS

| | | |
|---|---|---|
| JP | S61-223468 A | 10/1986 |
| JP | 2008-114583 A | 5/2008 |
| JP | 4743365 B2 | 8/2011 |
| WO | 2018/062011 A1 | 4/2018 |
| WO | 2018/062012 A1 | 4/2018 |
| WO | 2018/062541 A1 | 4/2018 |

OTHER PUBLICATIONS

Written Opinion of the ISA issued in International Application No. PCT/JP2019/044510 dated Dec. 24, 2019.

* cited by examiner base material (non-woven fabric)

base material (resin film and particles)

MULTILAYER STRUCTURE

CROSS-REFERENCE TO RELATED APPLICATIONS

This application is a continuation application of International Application No. PCT/JP2019/044510, filed Nov. 13, 2019, the disclosure of which is incorporated herein by reference in its entirety. Further, this application claims priority from Japanese Patent Application No. 2018-227602, filed Dec. 4, 2018, the disclosure of which is incorporated herein by reference in its entirety.

BACKGROUND OF THE INVENTION

1. Field of the Invention

The present disclosure relates to a multilayer structure.

2. Description of the Related Art

In recent years, a cooling technique utilizing radiative cooling has been studied in air conditioning apparatuses, buildings, and the like from the viewpoint of energy saving. For example, US2015/0338175A discloses a radiative cooling apparatus for cooling an object, the radiative cooling apparatus including an arrangement of a plurality of different materials located at different depths along a depth dimension relative to the object, in which the plurality of different materials include a solar spectrum reflecting portion and a thermally-emissive portion.

JP1982-150767A (JP-S57-150767A) discloses a radiative cooler in which several transparent plates having a high long-wavelength transmittance, which face each other with a predetermined space, are provided above a heat sink while facing the heat sink with a predetermined interval.

In addition, in buildings, a structure having heat insulating properties has been studied. For example, JP2008-114583A discloses a multilayer structure in which three or more translucent base material films face each other with a plurality of resin spacers made of a resin composition for a spacer interposed therebetween, in which the resin spacers are disposed to overlap each other in a laminating direction of the base material film with the base material film interposed therebetween.

SUMMARY OF THE INVENTION

One application of the cooling technique utilizing radiative cooling is a technique for cooling an object to be cooled disposed inside a structure having a radiative cooling function. However, in the conventionally proposed technique, a sufficient radiative cooling effect cannot be exhibited due to the incidence of solar light into the inside of the structure, and as a result, a problem that the object to be cooled disposed inside the structure cannot be sufficiently cooled may occur. For example, in the radiative cooling apparatus disclosed in US2015/0338175A, it is considered that since a high heat insulation effect cannot be obtained, and a polyethylene film is used as a window material, a radiative cooling effect is reduced by solar light reaching an inside of the radiative cooling apparatus. Even in the radiative cooler disclosed in JP1982-150767A (JP-S57-150767A), it is considered that a sufficient radiative cooling effect cannot be obtained due to solar light reaching an inside of the radiative cooler. In addition, in the multilayer structure disclosed in JP2008-114583A, it is considered that since it is necessary to increase a visible light transmittance of the multilayer structure, an infrared transmittance of the base material film is small. Furthermore, in the multilayer structure disclosed in JP2008-114583A, it is considered that since the translucent base material film is used, a radiative cooling effect is reduced by solar light reaching an inside of the multilayer structure.

The present disclosure has been made in view of the above circumstances.

An object of an aspect of the present disclosure is to provide a multilayer structure which has an excellent radiative cooling effect and can cool an object to be cooled disposed inside the structure.

Means for solving the above problems include the following aspects.

<1> A multilayer structure comprising a radiator, a base material layer that includes a region forming an interface in an internal structure, and a first air layer that is provided between the radiator and the base material layer, in which a far-infrared transmittance B of the base material layer and a solar light reflectance A of the multilayer structure satisfy B/(100−A)>7, and a solar light reflectance C of the base material layer is 30% or more.

<2> The multilayer structure according to <1>, in which the far-infrared transmittance B of the base material layer and the solar light reflectance C of the base material layer satisfy B/(100−C)>7.

<3> The multilayer structure according to <1> or <2>, in which the number of the base material layers is two or more.

<4> The multilayer structure according to <3>, further comprising a second air layer that is provided between the base material layers.

<5> The multilayer structure according to <4>, in which the multilayer structure has a structure in which the base material layer and the second air layer are alternately arranged.

<6> The multilayer structure according to <4> or <5>, in which a thickness of the second air layer is 5 cm or less.

<7> The multilayer structure according to any one of <1> to <6>, in which the far-infrared transmittance B of the base material layer and the solar light reflectance A of the multilayer structure satisfy B/(100−A)>20.

<8> The multilayer structure according to any one of <1> to <7>, in which the solar light reflectance C of the base material layer is 80% or more.

<9> The multilayer structure according to any one of <1> to <8>, in which an average diameter of the region forming the interface in the internal structure is 5000 nm or less.

<10> The multilayer structure according to any one of <1> to <9>, in which the region forming the interface in the internal structure is at least one selected from a void or a particle.

<11> The multilayer structure according to any one of <1> to <10>, in which the base material layer is a porous base material layer.

<12> The multilayer structure according to any one of <1> to <11>, in which a void volume of the base material layer is 40% or more.

<13> The multilayer structure according to any one of <1> to <12>, in which the base material layer contains polyolefin.

<14> The multilayer structure according to any one of <1> to <13>, in which the multilayer structure is a radiative cooling structure.

According to the aspect of the present disclosure, it is possible to provide a multilayer structure which has an excellent radiative cooling effect and can cool an object to be cooled disposed inside the structure.

DESCRIPTION OF THE PREFERRED EMBODIMENTS

Figure 1:
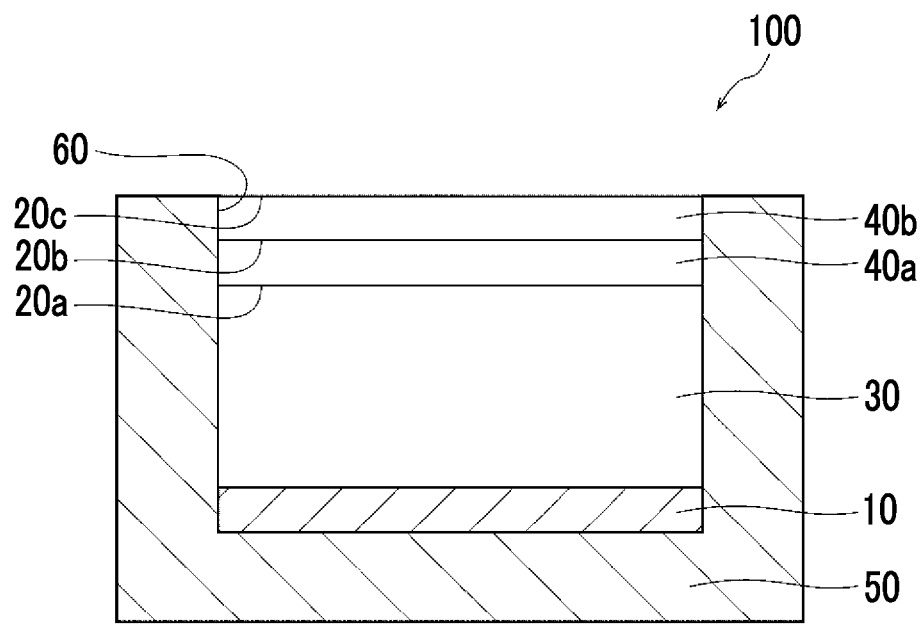
FIG. 1 is a schematic cross-sectional view showing an example of a multilayer structure according to the present disclosure.

Hereinafter, embodiments of the present disclosure will be described in detail. The present disclosure is not limited in any way to the following embodiments, and may be implemented with appropriate modifications within the scope of the purpose of the present disclosure.

In the present disclosure, the numerical range represented by "to" means a range including the numerical values before and after "to" as the lower limit and the upper limit. In the numerical ranges described stepwise in the present disclosure, the upper limit or the lower limit described in a certain numerical range may be replaced with the upper limit or the lower limit of another stepwise described numerical range. In addition, in the numerical range described in the present disclosure, the upper limit or the lower limit described in a certain numerical range may be replaced with the value shown in Examples.

In the present disclosure, the amount of each component in a composition means, in a case where the composition contains a plurality of substances corresponding to such a component, the total amount of the plurality of substances in the composition, unless otherwise specified.

In the present disclosure, "% by mass" and "% by weight" are synonymous, and "parts by mass" and "parts by weight" are synonymous.

In the present disclosure, combination of two or more preferred aspects is a more preferred aspect.

<Multilayer Structure>

A multilayer structure according to the present disclosure comprises a radiator, a base material layer that includes a region forming an interface in an internal structure (hereinafter, may be simply referred to as a "base material layer"), and a first air layer that is provided between the radiator and the base material layer, in which a far-infrared transmittance B of the base material layer and a solar light reflectance A of the multilayer structure satisfy B/(100−A)>7, and a solar light reflectance C of the base material layer is 30% or more.

The multilayer structure according to the present disclosure has an excellent radiative cooling effect and can cool an object to be cooled disposed inside the structure. Although the reason why the multilayer structure according to the present disclosure exhibits the above effect is not clear, it is supposed as follows.

The multilayer structure according to the present disclosure includes a radiator, a base material layer that includes a region forming an interface in an internal structure, and a first air layer that is provided between the radiator and the base material layer, in which a far-infrared transmittance B of the base material layer and a solar light reflectance A of the multilayer structure satisfy B/(100−A)>7, and a solar light reflectance C of the base material layer is 30% or more. Therefore, a temperature rise of the inside of the multilayer structure can be reduced by reducing the amount of solar light incident into the inside of the multilayer structure by reflection of solar light, and infrared rays radiated from the radiator can be easily emitted from the inside of the multilayer structure toward an outside of the multilayer structure. For this reason, it is considered that the multilayer structure according to the present disclosure has an excellent radiative cooling effect and can cool an object to be cooled disposed inside the structure.

In the present disclosure, the term "inside the structure" in the "object to be cooled disposed inside the structure" means a whole or a part of a region between the radiator and the base material layer.

In the present disclosure, the term "cool an object to be cooled" means lowering a temperature of the object to be cooled to be lower than a temperature of the outside of the multilayer structure, and is not necessarily limited to lowering the temperature of the object to be cooled to a specific temperature, but includes maintaining a state in which the temperature of the object to be cooled does not exceed an outside air temperature.

The far-infrared transmittance B of the base material layer and the solar light reflectance A of the multilayer structure satisfy B/(100−A)>7, preferably satisfy B/(100−A)>10, more preferably satisfy B/(100−A)>15, still more preferably satisfy B/(100−A)>20, and particularly preferably satisfy B/(100−A)>25. In a case where the far-infrared transmittance B of the base material layer and the solar light reflectance A of the multilayer structure satisfy the above relationship, the radiative cooling effect is excellent, and the object to be cooled disposed inside the structure can be cooled. Note that the upper limit of B/(100−A) is not limited, and can be appropriately set according to the application and the like. In the present disclosure, for example, 100>B/(100−A) may be used, 70>B/(100−A) may be used, or 50>B/(100−A) may be used. In "B/(100−A)", the value of B (far-infrared transmittance B of the base material layer) and the value of A (solar light reflectance A of the multilayer structure) are expressed as percentages (%), respectively.

A relational expression represented by B/(100−A)>7 means that the solar light reflectance A of the multilayer structure is large (in other words, an absorbance of solar light is small), and the far-infrared transmittance B of the base material layer is large. In the multilayer structure according to the present disclosure, a condition for cooling the radiator by radiative cooling is represented by $P_{in}-P_{out}<0$ (hereinafter, referred to as "Expression (A)"). In Expression (A), $P_{in}$ represents solar light energy per unit area incident from the outside of the multilayer structure into the inside of the multilayer structure, and is represented by $(100-A) \times P_{solar}/100$. Here, A represents a solar light reflectance (%) of the multilayer structure, and $P_{solar}$ represents an intensity of solar light. In Expression (A), $P_{out}$ represents energy radiated per unit area from the multilayer structure as far-infrared rays, and is represented by $(1-\varepsilon_{sky}) \times B \times \sigma \times T_{amb}^4/100$. Here, $\varepsilon_{sky}$ represents an effective emissivity of the sky, B represents a far-infrared transmittance (%) of the base material layer, σ represents a Stefan-Boltzmann constant, and $T_{amb}$ represents an outside air temperature. It is known that $\varepsilon_{sky}$ is about 0.7 on a clear day. Assuming that $P_{solar}$ is 1000 W/m², $\varepsilon_{sky}$ is 0.7, and $T_{amb}$ is 300K as typical weather conditions, B/(100−A)>7 is derived from Expression (A).

Therefore, since the multilayer structure satisfying B/(100−A)>7 reflects solar light and has a high transmittance of far-infrared rays, the multilayer structure has an excellent radiative cooling effect and can cool the object to be cooled disposed inside the structure.

The solar light reflectance A of the multilayer structure can be measured by the following method.

A diffuse reflectance of each of the radiator and the base material layer at a wavelength of 300 nm to 2500 nm is measured using an integrating sphere spectrophotometer (for example, V-670, manufactured by JASCO Corporation) according to a method described in JIS A 5759:2008. In a case where the multilayer structure includes two or more base material layers, the diffuse reflectance is measured for each base material layer. A value calculated from the measured value based on a Fresnel multiple reflection theory is defined as the solar light reflectance A. In a case where the multilayer structure includes another base material layer described below, a diffuse reflectance of the other base material layer is also included in the calculation of the solar light reflectance A.

The far-infrared transmittance B of the base material layer can be measured by the following method.

A spectral infrared diffuse reflectance and a spectral infrared diffuse transmittance of the base material layer at a wavelength of 2 μm to 25 μm are measured using a Fourier transform infrared spectrophotometer (for example, VIR-100, manufactured by JASCO Corporation) and an integrating sphere unit. In a case where the multilayer structure includes two or more base material layers, the spectral infrared diffuse transmittance is measured for each base material layer, and the spectral infrared diffuse transmittance of the base material layer is calculated based on the Fresnel multiple reflection theory. Next, a value obtained by weighting a blackbody radiation intensity at 25° C. with respect to the obtained spectral infrared diffuse transmittance is defined as the far-infrared transmittance B of the base material layer. Specifically, according to the following expression, the far-infrared transmittance B of the base material layer can be calculated by dividing "a value obtained by multiplying an infrared diffuse transmittance T by a spectral blackbody radiation intensity I and integrating the resultant value at a wavelength of 2 μm to 25 μm" by "a value obtained by integrating the spectral blackbody radiation intensity I at a wavelength of 2 μm to 25 μm". In a case where the multilayer structure includes another base material layer described below, a spectral infrared diffuse transmittance of the other base material layer is also included in the calculation of the far-infrared transmittance B.

$$\frac{\int (T(\lambda) \times I(\lambda)) d\lambda}{\int I(\lambda) d\lambda}$$

In the above expression, T represents a spectral infrared diffuse transmittance (%), I represents a spectral blackbody radiation intensity (W/m²) at 25° C., and λ represents a wavelength (μm).

An example of the multilayer structure according to the present disclosure will be described with reference to the drawings. FIG. 1 schematically shows the example of the multilayer structure according to the present disclosure. For example, as shown in FIG. 1, a multilayer structure 100 is a radiative cooling structure, and has a radiator 10, a base material layer 20a, a base material layer 20b, a base material layer 20c, a first air layer 30, a second air layer 40a, a second air layer 40b, and a housing 50 having an opening portion 60. The base material layer 20a, the base material layer 20b, and the base material layer 20c are each provided in the opening portion 60 of the housing 50. The first air layer 30 is provided between the radiator 10 and the base material layer 20a. The second air layer 40a is provided between the base material layer 20a and the base material layer 20b. The second air layer 40b is provided between the base material layer 20b and the base material layer 20c. Infrared rays radiated from the radiator 10 pass through the first air layer 30, the base material layer 20a, the second air layer 40a, the base material layer 20b, the second air layer 40b, and the base material layer 20c, and are emitted to an outside of the multilayer structure 100. Each of the base material layer 20a, the base material layer 20b, and the base material layer 20c can reduce a temperature rise of the radiator 10 by reducing the amount of solar light incident into an inside of the multilayer structure 100. In addition, since convection is suppressed in the second air layer 40a and the second air layer 40b provided between the base material layers, heat insulating properties of the multilayer structure 100 are improved. In the multilayer structure 100 shown in FIG. 1, the object to be cooled can be cooled by disposing the object to be cooled in a region (for example, a surface of the radiator 10) of the first air layer 30.

Hereinafter, the multilayer structure according to the present disclosure will be specifically described.

[Radiator]

The multilayer structure according to the present disclosure has a radiator. In a case where the multilayer structure has the radiator, infrared rays can be radiated and radiative cooling can be exhibited.

In the present disclosure, the "radiator" means an object exhibiting a high emissivity in a wavelength region where blackbody radiation occurs at a room temperature (for example, 25° C.). Specifically, an average emissivity of the radiator in a wavelength region of 5 μm to 25 μm at 25° C. is preferably 0.8 or more, and an average emissivity of the radiator in a wavelength region of 8 μm to 13 μm at 25° C. is more preferably 0.8 or more.

The average emissivity of the radiator in the wavelength region of 5 μm to 25 μm can be measured by the following method.

A spectral transmittance and a spectral reflectance of a measurement sample in the wavelength region of 5 μm to 25 μm at 25° C. are measured using a Fourier transform infrared spectrophotometer (for example, FTS-7000, manufactured by Varian, Inc.). In the wavelength region of 5 μm to 25 μm, a spectral emissivity is calculated for each wavelength of 0.5 μm based on Kirchhoff's law (spectral emissivity=1-spectral transmittance-spectral reflectance). An arithmetic mean value of the spectral emissivity at each wavelength is obtained, and the obtained value is used as the average emissivity in the wavelength range of 5 μm to 25 m.

The average emissivity of the radiator in the wavelength region of 8 μm to 13 μm is calculated by selecting the wavelength region of 8 μm to 13 μm instead of the wavelength region of 5 μm to 25 μm in the above method.

The radiator is not limited as long as it is an object exhibiting a high emissivity. Examples of the form of the radiator include a film, a sheet, a coating film, a heat insulating material, and a white reflection plate. In addition, the radiator may be a liquid, such as water. The radiator may be disposed on a support (for example, a glass substrate, a resin film, and a resin sheet).

Examples of the material constituting the radiator include polyethylene terephthalate, glass, acrylic, urethane, silicone, and water.

From the viewpoint of the infrared emissivity and the solar light reflectance, the radiator preferably exhibits diffuse reflection or specular reflection with respect to a spectrum of solar light. In particular, from the viewpoint of productivity, a foamed resin is preferable, and a foamed polyethylene terephthalate is more preferable.

As the radiator, a commercially available product may be used. Specific examples of the commercially available product include MCPET (registered trademark, white reflection plate made of foamed polyethylene terephthalate, manufactured by Furukawa Electric Co., Ltd.) and Lumirror (registered trademark) E20 (white reflective film made of polyethylene terephthalate, manufactured by Toray Industries, Inc.).

A shape of the radiator is not limited, and can be appropriately selected according to the application and the like. Examples of the shape of the radiator include a planar shape, a curved shape, a spherical shape, a prismatic shape, and a box shape.

The shape of the surface of the radiator is not limited. The surface of the radiator may be smooth or have an uneven structure.

A size of the radiator is not limited, and can be appropriately set according to the application and the like. For example, a thickness of the radiator may be 0.00001 cm to 50 cm.

The radiator preferably exhibits a high reflectance with respect to solar light from the viewpoint of reflecting solar light transmitted through the base material layer. A solar light reflectance of the radiator is preferably 70% or more, more preferably 80% or more, and particularly preferably 90% or more.

The solar light reflectance of the radiator can be measured by the following method.

A diffuse reflectance of the radiator at a wavelength of 300 nm to 2500 nm is measured using an integrating sphere spectrophotometer (for example, V-670, manufactured by JASCO Corporation) according to a method described in JIS A 5759:2008, and the obtained value is used as the solar light reflectance.

[Base Material Layer]

The multilayer structure according to the present disclosure has a base material layer that includes a region forming an interface in an internal structure. In addition, in the multilayer structure according to the present disclosure, the solar light reflectance C of the base material layer is 30% or more. The multilayer structure has the base material layer that includes the region forming the interface in the internal structure and has the solar light reflectance C of 30% or more, whereby the reflectance of solar light can be increased and the radiative cooling effect can be enhanced.

In the present disclosure, the term "region forming the interface in the internal structure" means a region forming an interface with a main material (that is, a base material (matrix)) constituting the base material layer inside the base material layer, and includes a tangible object and an intangible object. For example, in a case where the base material layer is a non-woven fabric, the region forming the interface in the internal structure means a "void" forming a solid-gas interface with fibers of the non-woven fabric. In addition, for example, in a case where the base material layer is a resin film containing particles, the region forming the interface in the internal structure means "particles" forming a solid-solid interface with a resin. The region forming the interface in the internal structure can be confirmed by observing a cross section of the base material layer using a scanning electron microscope (SEM). The number of the regions forming the interface in the internal structure may be one or two or more.

The interface formed in the internal structure may be a solid-gas interface, a solid-liquid interface, or a solid-solid interface, and from the viewpoint of the reflectance of solar light, it is preferably at least one interface selected from the group consisting of a solid-gas interface and a solid-solid interface, and more preferably a solid-gas interface.

Examples of the region forming the interface in the internal structure include a void, a bubble, and a particle (for example, an organic resin particle and an inorganic particle). For example, in a case where the region forming the interface in the internal structure is a void, a solid-gas interface is formed in the internal structure of the base material layer. In addition, for example, in a case where the region forming the interface in the internal structure is a particle, a solid-solid interface is formed in the internal structure of the base material layer. The region forming the interface in the internal structure is preferably at least one selected from a void or a particle, and more preferably a void, from the viewpoint of the reflectance of solar light.

The organic resin particle is not limited, and a known organic resin particle can be applied. From the viewpoint of the reflectance of solar light, the organic resin particle is preferably an organic resin particle having a refractive index different from that of the material of the base material layer. Specific examples of the organic resin particle include an acrylic resin particle, a polyester particle, a polyurethane particle, a polycarbonate particle, a polyolefin particle, and a polystyrene particle.

The inorganic particle is not limited, and a known inorganic particle can be applied. From the viewpoint of the reflectance of solar light, the inorganic particle is preferably an inorganic particle having a refractive index different from that of the material of the base material layer. Specific examples of the inorganic particle include a silicon oxide (silica) particle, a titanium oxide (titania) particle, a zirconium oxide (zirconia) particle, a magnesium oxide (magnesia) particle, and an aluminum oxide (alumina) particle.

A shape of the region forming the interface in the internal structure is not limited. The shape of the region forming the interface in the internal structure, which is observed in the cross section of the base material layer, may be, for example, a circular shape, an elliptical shape, or an indefinite shape.

From the viewpoint of the reflectance of solar light and the transmittance of infrared rays, an average diameter of the region forming the interface in the internal structure is preferably 5000 nm or less, more preferably 2000 nm or less, still more preferably 1000 nm or less, and particularly preferably 550 nm or less.

From the viewpoint of the reflectance of solar light, the average diameter of the region forming the interface in the internal structure is preferably 30 nm or more, more preferably 50 nm or more, and particularly preferably 100 nm or more.

The average diameter of the region forming the interface in the internal structure can be measured by the following method.

Ten cross sections of the base material layer in a thickness direction are observed at a magnification of 1000 times using a scanning electron microscope (for example, S4100, manufactured by Hitachi High-Technology Co., Ltd.), and a total of 10 observation images are acquired. From each image, 10 regions forming the interface in the internal structure are selected (note that, for an image in which the number of the regions (hereinafter, may be referred to as "specific regions" in this paragraph) forming the interface in the internal structure is less than 10, the number of specific regions corresponding to the maximum number of specific regions to be observed is selected). An outer periphery of the selected region forming the interface in the internal structure is traced, an arithmetic mean value of a circle equivalent diameter of the region forming the interface in the internal structure is obtained from the trace image using an image analysis device, and the obtained value is used as the average diameter of the region forming the interface in the internal structure.

The material of the base material layer is preferably a resin having a high infrared transmittance. Examples of the resin having a high infrared transmittance include a resin having an infrared transmittance of 50% or more at any wavelength in a range of 8 μm to 13 μm. Specific examples of the resin having a high infrared transmittance include chain polyolefin (for example, polyethylene and polypropylene), cyclic polyolefin (for example, polynorbornene), and polystyrene.

Among the above materials, the base material layer preferably contains polyolefin and preferably polyethylene from the viewpoint of the transmittance of infrared rays.

From the viewpoint of the transmittance of infrared rays, a content of polyolefin in the base material layer is preferably 80% by mass to 100% by mass, more preferably 90% by mass to 100% by mass, and particularly preferably 95% by mass to 100% by mass based on a mass of the base material layer.

From the viewpoint of reflection of solar light and the transmittance of infrared rays, the base material layer is preferably a base material layer containing a particle or a porous base material layer, and preferably a porous base material layer. Examples of the porous base material layer include a porous resin film and a non-woven fabric. From the viewpoint of reflection of solar light and the transmittance of infrared rays, the base material layer is preferably a porous resin film or a non-woven fabric, more preferably a porous polyethylene film or a polyethylene non-woven fabric, and particularly preferably a polyethylene non-woven fabric.

As the base material layer, a commercially available product may be used. Examples of the commercially available product include Tyvek (registered trademark, manufactured by DuPont-Asahi Flash Spun Products Co., Ltd.), Sunmap (registered trademark, manufactured by Nitto Denko Corporation), and Miraim (registered trademark, manufactured by Teijin Limited).

The solar light reflectance C of the base material layer is 30% or more, preferably 40% or more, more preferably 50% or more, still more preferably 80% or more, and particularly preferably 90% or more. By adjusting the solar light reflectance C of the base material layer within the above numerical range, the radiative cooling effect is excellent, and the object to be cooled disposed inside the structure can be cooled. The upper limit of the solar light reflectance C of the base material layer is not limited. The solar light reflectance C of the base material layer may be, for example, 100% or less.

The solar light reflectance C of the base material layer can be measured by the following method.

A diffuse reflectance of the base material layer at a wavelength of 300 nm to 2500 nm is measured using an integrating sphere spectrophotometer (for example, V-670, manufactured by JASCO Corporation) in accordance with a method described in JIS A 5759:2008, and the obtained value is defined as the solar light reflectance C. In a case where the multilayer structure includes two or more base material layers, the diffuse reflectance is measured for each base material layer, and the solar light reflectance C of the base material layer is calculated based on the Fresnel multiple reflection theory. In addition, in a case where the multilayer structure includes another base material layer described below, a diffuse reflectance of the other base material layer is also included in the calculation of the solar light reflectance C.

The far-infrared transmittance B of the base material layer and the solar light reflectance C of the base material layer preferably satisfy $B/(100-C)>7$, more preferably satisfy $B/(100-C)>8$, and particularly preferably satisfy $B/(100-C)>10$. In a case where the far-infrared transmittance B of the base material layer and the solar light reflectance C of the base material layer satisfy the above relationship, the radiative cooling effect is excellent, and the object to be cooled disposed inside the structure can be cooled. A method for measuring the far-infrared transmittance B of the base material layer and the solar light reflectance C of the base material layer is as described above. Note that the upper limit of $B/(100-C)$ is not limited, and can be appropriately set according to the application and the like. In the present disclosure, for example, $100>B/(100-C)$ may be used, $50>B/(100-C)$ may be used, or $30>B/(100-C)$ may be used. In "$B/(100-C)$", the value of B (far-infrared transmittance B of the base material layer) and the value of C (solar light reflectance C of the base material layer) are expressed as percentages (%), respectively.

A relational expression represented by $B/(100-C)>7$ is such that in the above relational expression represented by $B/(100-A)>7$, the solar light reflectance C of the base material layer is considered instead of the solar light reflectance A of the multilayer structure. That is, the relational expression represented by $B/(100-C)>7$ means that the solar light reflectance C of the base material layer is large and the far-infrared transmittance B of the base material layer is large.

From the viewpoint of the transmittance of infrared rays, a void volume of the base material layer is preferably 40% or more, more preferably 45% or more, still more preferably 50% or more, and particularly preferably 60% or more. The void volume of the base material layer is preferably 90% or less and more preferably 80% or less, from the viewpoint of the base material strength.

The void volume of the base material layer can be measured by the following method.

A volume and a mass of the base material layer are measured to calculate a density of the base material layer. A ratio of a density of the base material layer to a density of the material constituting the base material layer is calculated, and the obtained value is used as the void volume of the base material layer. In a case where the number of the base material layers having a void is two or more, an arithmetic mean value of the ratio of the density of the base material layer to the density of the material constituting the base material layer is obtained, and the obtained value is used as the void volume of the base material layer. In the measurement of the void volume of the base material layer, the volume of the base material layer is measured by an Archimedes method (solvent: water, temperature: 25° C.), and the mass of the base material layer is measured using a scale. The method for measuring the density of the base material layer can also be applied to the method for measuring the density of the material constituting the base material layer, as necessary.

The number of the base material layers is at least one, preferably two or more, and more preferably three or more. In a case where the number of the base material layers is two or more, the reflectance of solar light can be improved, and a high heat insulation effect can also be obtained. From the viewpoint of the transmittance of infrared rays, the number of the base material layers is preferably 7 or less and more preferably 5 or less. In a case where the number of the base material layers is two or more, the base material layers may be the same or different from each other.

In a case where the number of the base material layers is two or more, an interval between the base material layers is preferably 5 cm or less, more preferably 4 cm or less, and particularly preferably 3 cm or less. The lower limit of the interval between the base material layers is not limited. The interval between the base material layers may be, for example, 0.1 cm or more.

The interval between the base material layers can be measured by the following method.

A minimum value and a maximum value of the interval between the two base material layers facing each other are measured, and an arithmetic mean value of the measured values is used as the interval between the base material layers. In a case where there are two or more intervals between the base material layers, the intervals between the base material layers are respectively obtained by the same method as described above, and an arithmetic mean value of the obtained values is used as the interval between the base material layers.

The base material layer is preferably arranged on the radiator from the viewpoint of radiative cooling. The base material layer may be arranged at a position where a horizontal plane and a main surface of the base material layer are parallel to each other, or may be arranged at a position where the horizontal plane and the main surface of the base material layer intersect with each other. From the viewpoint of radiative cooling and the solar light reflectance, the base material layer is preferably arranged at a position where an incident direction of solar light and the main surface of the base material layer intersect with each other. In addition, in a case where the number of the base material layers is two or more, a relative positional relationship of each base material layer is not limited. In a case where the number of the base material layers is two or more, each base material layer may or may not be arranged hierarchically (for example, each base material layer may be arranged on the same plane). In a case where the number of the base material layers is two or more, each base material layer is preferably hierarchically arranged from the viewpoint of radiative cooling and the solar light reflectance, and more preferably hierarchically arranged at a position where the incident direction of solar light and the main surface of each base material layer intersect with each other. Here, the term "main surface of the base material layer" means a surface of the base material layer orthogonal to the thickness direction of the base material layer.

A thickness of the base material layer is not limited, and can be appropriately set according to the application and the like. The thickness of the base material layer may be, for example, 20 μm to 5000 μm.

The base material layer may be provided on an inner peripheral portion, an opening portion, or the like of a housing, which will be described below, or may be provided through a spacer.

[First Air Layer]

The multilayer structure according to the present disclosure has a first air layer provided between the radiator and the base material layer. In a case where the multilayer structure has the first air layer, a high heat insulation effect can be obtained.

A medium constituting the first air layer is not necessarily limited to air, and may be a gas, such as nitrogen or argon. The medium constituting the first air layer is preferably air from the viewpoint of workability.

The first air layer need only be provided between the radiator and the base material layer, and is preferably a space formed by the radiator and the base material layer (in a case where the multilayer structure has two or more base material layers, it refers to the base material layer provided on a side closest to the radiator among the two base material layers) facing each other. In addition, the first air layer may be a space formed by the radiator and another base material layer facing each other or may be a space formed by two other base material layers facing each other, as long as it does not deviate from the gist of the present disclosure. The other base material layer will be described below.

A size and a capacity of the first air layer are not limited, and can be appropriately set according to the application.

[Second Air Layer]

In a case where the multilayer structure according to the present disclosure has two or more base material layers, the multilayer structure according to the present disclosure preferably has a second air layer between the base material layers. In a case where the multilayer structure has the second air layer between the base material layers, a high heat insulation effect can be obtained. The number of the second air layers may be one or two or more.

The second air layer need only be provided between the base material layers, and is preferably a space formed by two base material layers facing each other from the viewpoint of heat insulating properties. From the viewpoint of heat insulating properties, the multilayer structure according to the present disclosure preferably has a structure in which the base material layer and the second air layer are alternately arranged.

A thickness of the second air layer is preferably 5 cm or less, more preferably 4 cm or less, and particularly preferably 3 cm or less. By adjusting the thickness of the second air layer within the above numerical range, convection in the air layer can be suppressed and the heat insulation effect can be further improved. The lower limit of the thickness of the second air layer is not limited. The thickness of the second air layer may be, for example, 0.1 cm or more.

The thickness of the second air layer can be measured by the following method.

A minimum value and a maximum value of the thickness of the second air layer are measured, and an arithmetic mean value of the measured values is used as the thickness of the second air layer. In a case where there are two or more second air layers, the thicknesses of the second air layers are respectively obtained by the same method as described above, and an arithmetic mean value of the obtained values is used as the thickness of the second air layer.

[Other Members]

(Base Material Layer that does not Include Region Forming Interface in Internal Structure)

The multilayer structure according to the present disclosure may have a base material layer that does not include the region forming the interface in the internal structure (hereinafter, may be referred to as "another base material layer") in a range satisfying $B/(100-A) > 7$ and a range in which the solar light reflectance C of the base material layer is 30% or more. Examples of the other base material layer include a resin film, such as a polyolefin film. The number of other base material layers may be one or two or more.

A ratio of the number of the base material layers including the region forming the interface in the internal structure to the total number of the base material layers including the region forming the interface in the internal structure and base material layers not including the region forming the interface in the internal structure (that is, other base material layers) is preferably 50% or more, more preferably 65% or more, still more preferably 80% or more, particularly preferably 90% or more, and most preferably 100% or more.

(Housing)

The multilayer structure according to the present disclosure may have a housing. In a case where the multilayer structure according to the present disclosure has the housing, for example, the radiator, the base material layer, the first air layer, and the like can be provided inside the housing.

The housing may be configured of a single member or may be configured of a combination of a plurality of members. From the viewpoint of heat insulating properties, the housing is preferably configured of a heat insulating material. The heat insulating material is not limited, and can be appropriately selected from known heat insulating materials.

The housing preferably has an opening portion at least in an upper portion from the viewpoint of radiative cooling. The number of the opening portions is not limited, and may be one, may be two or more, and is preferably one from the viewpoint of radiative cooling. A shape of the opening portion is not limited, and can be appropriately selected according to the application and the like. Examples of the shape of the opening portion include a circular shape, a quadrangular shape, a hexagonal shape, and an amorphous shape.

Modification Example

Figure 2:
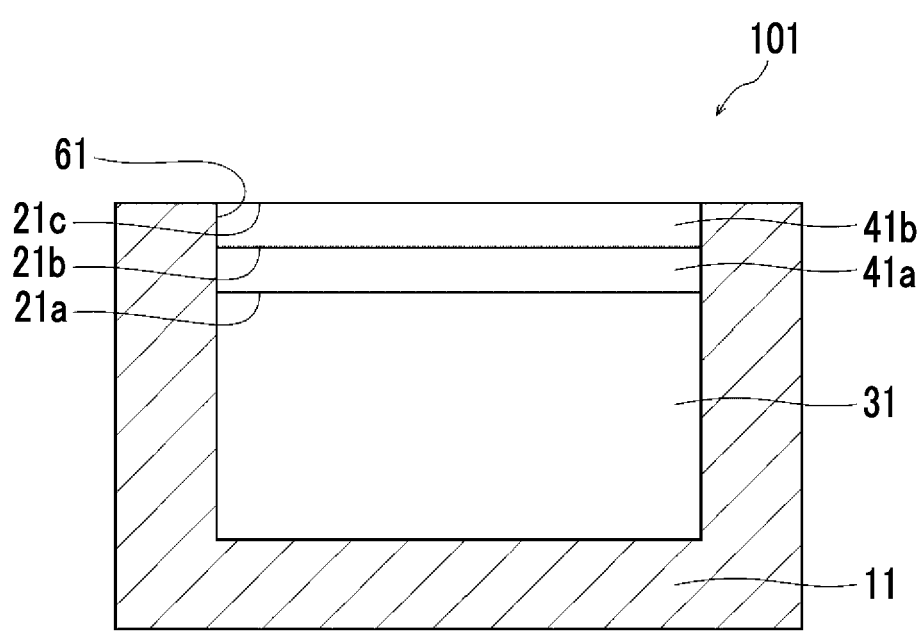
FIG. 2 is a schematic cross-sectional view showing a modification example of the multilayer structure according to the present disclosure.
Figure 3:
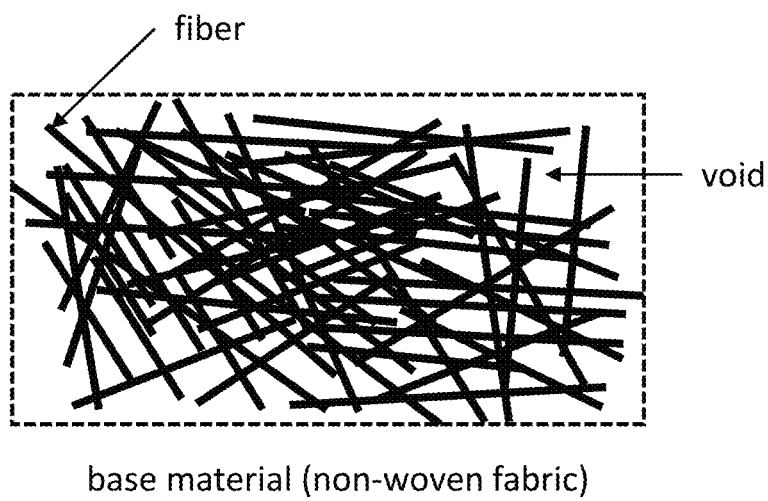
FIG. 3 is a schematic cross-sectional view showing the base material in the case in which the base material is a non-woven fabric.
Figure 4:
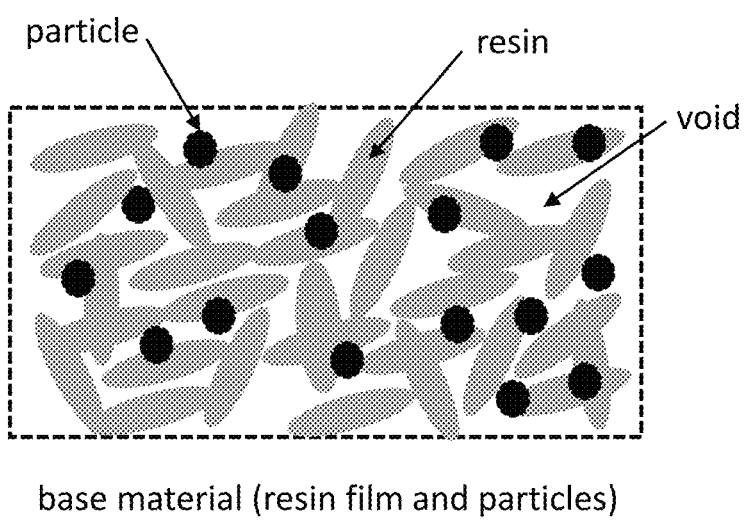
FIG. 4 is a schematic cross-sectional view showing the base material in the case in which the base material is a resin film containing particles.

A modification example of the multilayer structure according to the present disclosure will be described with reference to the drawings. FIG. 2 schematically shows the modification example of the multilayer structure according to the present disclosure. For example, as shown in FIG. 2, a multilayer structure 101 is a radiative cooling structure, and has a radiator 11 having an opening portion 61, a base material layer 21a, a base material layer 21b, a base material layer 21c, a first air layer 31, a second air layer 41a, and a second air layer 41b. The base material layer 21a, the base material layer 21b, and the base material layer 21c are each provided in the opening portion 61 of the radiator 11. The first air layer 31 is provided between the radiator 11 and the base material layer 21a. The second air layer 41a is provided between the base material layer 21a and the base material layer 21b. The second air layer 41b is provided between the base material layer 21b and the base material layer 21c.

[Application]

The multilayer structure according to the present disclosure has an excellent radiative cooling effect and can cool the object to be cooled disposed inside the structure, and therefore can be suitably used as a radiative cooling structure (for example, a radiative cooling apparatus). Specifically, the multilayer structure according to the present disclosure can be applied to, for example, a window material, a heat shield material for a rooftop, and a cold insulation device. The application of the multilayer structure according to the present disclosure is not limited to cooling of the object to be cooled disposed inside the structure. As exemplified above, the multilayer structure according to the present disclosure can be applied to various cooling techniques utilizing radiative cooling.

EXAMPLES

Hereinafter, the present disclosure will be described in detail by way of Examples, but is not limited thereto.

Example 1

A housing having one opening portion in an upper portion was manufactured using a heat insulating material having a thickness of 10 cm (product name: STYROACE-II, manufactured by Dow Kakoh Co., Ltd.). As regards dimensions of the inside of the housing, a length is 30 cm, a width is 40 cm, and a height is 10 cm. As a radiator, a white reflection plate (foamed polyethylene terephthalate, product name: MCPET, manufactured by Furukawa Electric Co., Ltd.) was provided on a bottom surface of the inside of the housing. Next, at a position 10 cm from a surface of the white reflection plate to a direction of the opening portion, one polyethylene non-woven fabric (product name: Tyvek 1442R, void volume: 69%, average diameter of void: 500 nm, thickness: 140 µm, manufactured by DuPont-Asahi Flash Spun Products Co., Ltd.) was provided as a base material layer, thereby obtaining a multilayer structure (hereinafter, may be simply referred to as a "structure"). An air layer formed of a white reflection plate and a polyethylene non-woven fabric exists inside the housing.

Example 2

A multilayer structure was obtained in the same manner as in Example 1 except that two polyethylene non-woven fabrics used in Example 1 were provided at an interval of 4 cm. A distance between the polyethylene non-woven fabric closest to the white reflection plate and the white reflection plate is 2 cm.

Example 3

A multilayer structure was obtained in the same manner as in Example 1 except that three polyethylene non-woven fabrics used in Example 1 were provided at an interval of 3 cm. A distance between the polyethylene non-woven fabric closest to the white reflection plate and the white reflection plate is 2 cm.

Example 4

A multilayer structure was obtained in the same manner as in Example 1 except that a porous polyethylene film (product name: Sunmap LC 0.2 t, void volume: 30%, average diameter of void: 4000 nm, thickness: 200 µm, manufactured by Nitto Denko Corporation) was used instead of the polyethylene non-woven fabric used in Example 1.

Example 5

A multilayer structure was obtained in the same manner as in Example 4 except that two porous polyethylene films used in Example 4 were provided at an interval of 4 cm. A distance between the porous polyethylene film closest to the white reflection plate and the white reflection plate is 2 cm.

Example 6

A multilayer structure was obtained in the same manner as in Example 4 except that three porous polyethylene films used in Example 4 were provided at an interval of 3 cm. A distance between the porous polyethylene film closest to the white reflection plate and the white reflection plate is 2 cm.

Comparative Example 1

A structure was obtained in the same manner as in Example 1 except that the polyethylene non-woven fabric was not used.

Comparative Example 2

A multilayer structure was obtained in the same manner as in Example 1 except that a polyethylene film (product name: SAN8041, thickness: 50 μm, manufactured by Sanplatec Co., Ltd.) was used instead of the polyethylene non-woven fabric used in Example 1. The polyethylene film used in Comparative Example 2 is a base material layer that does not include a region forming an interface in an internal structure.

Comparative Example 3

A multilayer structure was obtained in the same manner as in Example 1 except that a polyethylene terephthalate film (product name: Lumirror S10, thickness: 188 μm, manufactured by Toray Industries, Inc.) was used instead of the polyethylene non-woven fabric used in Example 1.

Comparative Example 4

A multilayer structure was obtained in the same manner as in Example 1 except that a porous polyethylene film (product name: Sunmap LC 0.1 t, void volume: 30%, average diameter of void: 4000 nm, thickness: 100 μm, manufactured by Nitto Denko Corporation) was used instead of the polyethylene non-woven fabric used in Example 1.

<Evaluation>

[Radiative Cooling Effect]

A black plastic piece of 2 cm square was disposed as a test piece in the center of the surface of the white reflection plate in each structure of Examples 1 to 6 and Comparative Examples 1 to 4. Next, each structure in which the test piece was disposed was installed outdoors in a time zone in which the sun rises on a clear day (11:00 AM to 1:00 PM). In a case of installing each structure, the opening portion of the housing was disposed toward a zenith direction. A temperature $T1$ (° C.) and an outside air temperature $T2$ (° C.) of the test piece were measured using a thermocouple, and the radiative cooling effect was evaluated based on the following criteria. Evaluation results are shown in Table 1. Note that the temperature $T1$ (° C.) and the outside air temperature $T2$ (° C.) of the test piece are average temperatures in the above time zone.

(Criteria)
A: 5° C.≤T2−T1
B: 0° C.≤T2−T1<5° C.
C: T2−T1<0° C. (that is, T1>T2)

[Thermal Conductivity]

In each structure of Examples 1 to 6 and Comparative Examples 1 to 4, a cold insulator of a low temperature (−5° C. or lower) was disposed between the white reflection plate and the bottom surface (heat insulating material) of the inside of the housing, and the opening portion was covered with aluminum foil. Using a thermocouple, the temperature $T1$ (° C.) at the center of the surface of the white reflection plate and the temperature $T2$ (° C.) at the center of the base material layer disposed on the outermost surface layer among the base material layers were measured. A thermal conductivity W of each multilayer structure of Examples 1 to 4 and Comparative Examples 1 and 2 was calculated by the following expression. Evaluation results are shown in Table 1.

Expression: $W=(T2-C) \times J \times D/(T1-T2)$

In the expression, C represents an outside air temperature (unit: ° C.), J represents a surface thermal conductivity (W/(m²·K)), and D represents a thickness of the structure (unit: m (meters)). Here, the thickness of the structure means a distance from the lower surface of the radiator to the base material layer disposed on the outermost surface layer among the base material layers.

TABLE 1

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Solar light reflectance A of multilayer structure (%) | 97 | 97 | 98 | 96 | 96 | 97 | 96 | 96 | 96 | 97 |
| Far-infrared transmittance B of base material layer (%) | 78 | 65 | 52 | 86 | 70 | 53 | 100 | 90 | 10 | 88 |
| Solar light reflectance C of base material layer (%) | 87 | 92 | 95 | 38 | 55 | 64 | 0 | 9 | 9 | 23 |
| B/(100−A) | 26 | 22 | 26 | 22 | 18 | 18 | 25 | 23 | 3 | 29 |
| B/(100−C) | 6 | 8 | 10 | 1 | 2 | 1 | 1 | 1 | 0 | 1 |
| Radiative cooling effect | B | A | A | B | B | B | C | C | C | C |
| Thermal conductivity (W/(m·K)) | 0.053 | 0.048 | 0.040 | 0.055 | 0.046 | 0.039 | 0.085 | 0.055 | 0.055 | 0.054 |

From Table 1, it was found that the multilayer structure of each of Examples 1 to 6, which includes a radiator, a base material layer that includes a region forming an interface in an internal structure, and a first air layer that is provided between the radiator and the base material layer, in which a far-infrared transmittance B of the base material layer and a solar light reflectance A of the multilayer structure satisfy $B/(100-A)>7$, and a solar light reflectance C of the base material layer is 30% or more, had an excellent radiative cooling effect and a low thermal conductivity in the daytime. It was found that the multilayer structure of each of Examples 2 and 3 had a particularly excellent radiative cooling effect because the far-infrared transmittance B of the base material layer and the solar light reflectance C of the base material layer satisfied $B/(100-C)>7$. In addition, it was found that the radiative cooling effect was improved and the thermal conductivity was further lowered by setting the number of the base material layers included in the multilayer structure to two or more.

On the other hand, it was found that the structures of Comparative Examples 1 to 4 were inferior to the structures of Examples 1 to 6 in radiative cooling effect and also had a higher thermal conductivity than the structures of Examples 1 to 6.

The disclosure of JP2018-227602 filed on Dec. 4, 2018 is incorporated herein by reference in its entirety. All documents, patent applications, and technical standards described in the present specification are herein incorporated by reference to the same extent that each individual document, patent application, or technical standard was specifically and individually indicated to be incorporated by reference.

What is claimed is:

1. A multilayer structure comprising:
   a radiator;
   a base material layer that includes a region forming an interface in an internal structure; and
   a first air layer that is provided between the radiator and the base material layer,
   wherein a far-infrared transmittance B of the base material layer and a solar light reflectance A of the multilayer structure satisfy $B/(100-A) >7$,
   a solar light reflectance C of the base material layer is 30% or more,
   the base material layer is a non-woven fabric or a resin film containing particles,
   in a case in which the base material layer is the non-woven fabric, the region forming the interface in the internal structure comprises voids forming a solid-gas interface with fibers of the non-woven fabric, and
   in a case in which the base material layer is the resin film containing the particles, the region forming the interface in the internal structure comprises the particles forming a solid-solid interface with the resin.

2. The multilayer structure according to claim 1, wherein the far-infrared transmittance B of the base material layer and the solar light reflectance C of the base material layer satisfy $B/(100-C)>7$.

3. The multilayer structure according to claim 1, wherein the number of the base material layers is two or more.

4. The multilayer structure according to claim 3, further comprising:
   a second air layer that is provided between the base material layers.

5. The multilayer structure according to claim 4, wherein a thickness of the second air layer is 5 cm or less.

6. The multilayer structure according to claim 1, wherein the far-infrared transmittance B of the base material layer and the solar light reflectance A of the multilayer structure satisfy $B/(100-A)>20$.

7. The multilayer structure according to claim 1, wherein the solar light reflectance C of the base material layer is 80% or more.

8. The multilayer structure according to claim 1, wherein an average diameter of the region forming the interface in the internal structure is 5000 nm or less.

9. The multilayer structure according to claim 1, wherein the region forming the interface in the internal structure is at least one selected from a void or a particle.

10. The multilayer structure according to claim 1, wherein the base material layer is a porous base material layer.

11. The multilayer structure according to claim 1, wherein a void volume of the base material layer is 40% or more.

12. The multilayer structure according to claim 1, wherein the base material layer contains polyolefin.

13. The multilayer structure according to claim 1, wherein the multilayer structure is a radiative cooling structure.

* * * * *